United States Patent
Rosa et al.

(10) Patent No.: US 12,495,436 B2
(45) Date of Patent: Dec. 9, 2025

(54) DELAY INFORMATION

(71) Applicant: Nokia Technologies Oy, Espoo (FI)

(72) Inventors: Claudio Rosa, Aalborg (DK); Morten Toft, Aalborg (DK); Renato Barbosa Abreu, Aalborg (DK); Daniela Laselva, Aalborg (DK); Ali Karimidehkordi, Munich (DE); Roberto Maldonado, Aalborg (DK)

(73) Assignee: NOKIA TECHNOLOGIES OY, Espoo (FI)

( * ) Notice: Subject to any disclaimer, the term of this patent is extended or adjusted under 35 U.S.C. 154(b) by 325 days.

(21) Appl. No.: 18/250,143

(22) PCT Filed: Nov. 6, 2020

(86) PCT No.: PCT/EP2020/081223
§ 371 (c)(1),
(2) Date: Apr. 21, 2023

(87) PCT Pub. No.: WO2022/096118
PCT Pub. Date: May 12, 2022

(65) Prior Publication Data
US 2023/0397241 A1    Dec. 7, 2023

(51) Int. Cl.
 *H04W 72/21* (2023.01)
 *H04W 72/1263* (2023.01)
 *H04W 72/542* (2023.01)
(52) U.S. Cl.
 CPC ..... *H04W 72/542* (2023.01); *H04W 72/1263* (2013.01); *H04W 72/21* (2023.01)

(58) Field of Classification Search
None
See application file for complete search history.

(56) References Cited

U.S. PATENT DOCUMENTS

2017/0230986 A1* 8/2017 Moon .................. H04W 74/08
2017/0332358 A1 11/2017 Park et al.
(Continued)

FOREIGN PATENT DOCUMENTS

WO    2015/151729 A1    10/2015
WO    2016/054584 A2    4/2016
(Continued)

OTHER PUBLICATIONS

"3rd Generation Partnership Project; Technical Specification Group Radio Access Network; Physical layer procedures for shared spectrum channel access (Release 16)", 3GPP TS 37.213, V16.1.0, Mar. 2020, pp. 1-25.
(Continued)

*Primary Examiner* — Kodzovi Acolatse
(74) *Attorney, Agent, or Firm* — Carter, DeLuca & Farrell LLP

(57) ABSTRACT

An apparatus, method and computer program product for: performing channel availability monitoring on an operating channel for transmitting uplink control information for transmitting a data packet, in response to determining that the operating channel is available for transmitting the uplink control information, determining delay information relating to the channel availability monitoring, and transmitting the uplink control information and the delay information to the radio access network.

1 Claim, 4 Drawing Sheets

(56) References Cited

U.S. PATENT DOCUMENTS

| | | | | |
|---|---|---|---|---|
| 2018/0242234 | A1* | 8/2018 | Semaan | H04W 48/18 |
| 2018/0242357 | A1 | 8/2018 | Khirallah et al. | |
| 2019/0116489 | A1* | 4/2019 | Harada | H04W 72/23 |
| 2019/0274137 | A1 | 9/2019 | Bhattad et al. | |
| 2020/0296749 | A1* | 9/2020 | Freda | H04W 4/80 |
| 2021/0126679 | A1* | 4/2021 | Yuan | H04L 5/006 |
| 2022/0030519 | A1* | 1/2022 | Zhou | H04W 4/021 |
| 2022/0039016 | A1* | 2/2022 | Terry | H04W 74/0808 |
| 2023/0397241 | A1* | 12/2023 | Rosa | H04W 72/21 |
| 2024/0414759 | A1* | 12/2024 | Rune | H04W 36/22 |

FOREIGN PATENT DOCUMENTS

| | | |
|---|---|---|
| WO | 2019/036622 A1 | 2/2019 |
| WO | 2020/069114 A1 | 4/2020 |
| WO | 2020/153610 A1 | 7/2020 |
| WO | 2020/186393 A1 | 9/2020 |

OTHER PUBLICATIONS

"3rd Generation Partnership Project; Technical Specification Group Radio Access Network; NR; Physical channels and modulation (Release 16)", 3GPP TS 38.211, V16.1.0, Mar. 2020, pp. 1-130.

"3rd Generation Partnership Project; Technical Specification Group Radio Access Network; NR; NR and NG-RAN Overall Description; Stage 2 (Release 16)", 3GPP TS 38.300, V16.1.0, Mar. 2020, pp. 1-133.

"SR transmission and procedure for NR-U", 3GPP TSG-RAN WG2 Meeting #103bis, R2-1813585, Agenda: 11.2.1.2, OPPO, Oct. 8-12, 2018, pp. 1-3.

"3rd Generation Partnership Project; Technical Specification Group Radio Access Network; NR; Radio Resource Control (RRC) protocol specification (Release 16)", 3GPP TS 38.331, V16.0.0, Mar. 2020, pp. 1-835.

"3rd Generation Partnership Project; Technical Specification Group Radio Access Network; NR; Physical layer procedures for control (Release 16)", 3GPP TS 38.213, V16.1.0, Mar. 2020, pp. 1-156.

"3rd Generation Partnership Project; Technical Specification Group Radio Access Network; NR; Multiplexing and channel coding (Release 16)", 3GPP TS 38.212, V16.1.0, Mar. 2020, pp. 1-146.

"Scheduling request for NR-U", 3GPP TSG-RAN WG2 #103-Bis, R2-1815032, Agenda: 11.2.1.1, Ericsson, Oct. 8-12, 2018, 4 pages.

"Rel-17 NR-U Enhancements email discussion [Unlicensed_enh] Summary", 3GPP TSG RAN Meeting #86, RP-192923, Agenda: 9.1.1, Nokia, Dec. 9-12, 2019, pp. 1-23.

Karaki et al., "Uplink Performance of Enhanced Licensed Assisted Access (eLAA) in Unlicensed Spectrum", IEEE Wireless Communications and Networking Conference (WCNC), Mar. 19-22, 2017, 6 pages.

Ali et al., "Fair and Efficient Channel Observation-Based Listen-Before Talk (CoLBT) for LAA-WIFI Coexistence in Unlicensed LTE", Tenth International Conference on Ubiquitous and Future Networks (ICUFN), Jul. 3-6, 2018, pp. 162-167.

International Search Report and Written Opinion received for corresponding Patent Cooperation Treaty Application No. PCT/EP2020/081223, dated Aug. 9, 2021, 11 pages.

Office action received for corresponding European Patent Application No. 20803525.3, dated Mar. 21, 2025, 7 pages.

* cited by examiner

| NUMBER OF MISSED SR OCCASIONS | SR RESOURCE ID |
|---|---|
| 0 | 0 |
| 1 | 1 |
| 2 | 2 |
| >2 | 3 |

| SR bits | SR status | DELAY INFORMATION |
|---|---|---|
| 00 | NEGATIVE (NO SR) | - |
| 01 | POSITIVE | 0 |
| 10 | POSITIVE | 1 |
| 11 | POSITIVE | >= 2 |

DELAY INFORMATION

RELATED APPLICATION

This application was originally filed as PCT Application No. PCT/EP2020/081223, filed on Nov. 6, 2020, which is incorporated herein by reference in its entirety.

TECHNICAL FIELD

The present application relates generally to determining delay information. More specifically, the present application relates to determining delay information relating to the channel availability monitoring.

BACKGROUND

Wireless networks are designed to support a wide range of spectrum bands. The spectrum can be categorised into a licensed spectrum and an unlicensed spectrum. The licensed spectrum is assigned exclusively to operators for independent usage while the unlicensed spectrum is assigned to at least one user for non-exclusive usage.

SUMMARY

Various aspects of examples of the disclosure are set out in the claims. The scope of protection sought for various embodiments of the disclosure is set out by the independent claims. The examples and features, if any, described in this specification that do not fall under the scope of the independent claims are to be interpreted as examples useful for understanding various embodiments of the disclosure.

According to a first aspect of the disclosure, there is provided an apparatus comprising means for: performing channel availability monitoring on an operating channel for transmitting uplink control information for transmitting a data packet, in response to determining that the operating channel is available for transmitting the uplink control information, determining delay information relating to the channel availability monitoring, and transmitting the uplink control information and the delay information to the radio access network.

According to a second aspect of the disclosure, there is provided a method comprising: performing channel availability monitoring on an operating channel for transmitting uplink control information for transmitting a data packet, in response to determining that the operating channel is available for transmitting the uplink control information, determining delay information relating to the channel availability monitoring, and transmitting the uplink control information and the delay information to the radio access network.

According to a third aspect of the disclosure, there is provided a computer program comprising instructions for causing an apparatus to perform at least the following: performing channel availability monitoring on an operating channel for transmitting uplink control information for transmitting a data packet, in response to determining that the operating channel is available for transmitting the uplink control information, determining delay information relating to the channel availability monitoring, and transmitting the uplink control information and the delay information to the radio access network.

According to a fourth aspect of the disclosure, there is provided an apparatus comprising at least one processor and at least one memory including computer program code, the at least one memory and the computer program code configured to with the at least one processor, cause the apparatus at least to: perform channel availability monitoring on an operating channel for transmitting uplink control information for transmitting a data packet, in response to determining that the operating channel is available for transmitting the uplink control information, determine delay information relating to the channel availability monitoring, and transmit the uplink control information and the delay information to the radio access network According to a fifth aspect of the disclosure, there is provided a non-transitory computer readable medium comprising program instructions for causing an apparatus to perform at least the following: performing channel availability monitoring on an operating channel for transmitting uplink control information for transmitting a data packet, in response to determining that the operating channel is available for transmitting the uplink control information, determining delay information relating to the channel availability monitoring, and transmitting the uplink control information and the delay information to the radio access network.

According to a sixth aspect of the disclosure, there is provided a computer readable medium comprising program instructions for causing an apparatus to perform at least the following: performing channel availability monitoring on an operating channel for transmitting uplink control information for transmitting a data packet, in response to determining that the operating channel is available for transmitting the uplink control information, determining delay information relating to the channel availability monitoring, and transmitting the uplink control information and the delay information to the radio access network.

According to a seventh aspect of the disclosure, there is provided an apparatus comprising means for: sending to a terminal device configuration information relating to determining delay information relating to channel availability monitoring, receiving delay information relating to the channel availability monitoring from the terminal device, and performing scheduling based on the delay information.

According to an eight aspect of the disclosure, there is provided a method comprising: sending to a terminal device configuration information relating to determining delay information relating to channel availability monitoring, receiving delay information relating to the channel availability monitoring from the terminal device, and performing scheduling based on the delay information.

According to a ninth aspect of the disclosure, there is provided a computer program comprising instructions for causing an apparatus to perform at least the following: sending to a terminal device configuration information relating to determining delay information relating to channel availability monitoring, receiving delay information relating to the channel availability monitoring from the terminal device, and performing scheduling based on the delay information.

According to a tenth aspect of the disclosure, there is provided an apparatus comprising at least one processor and at least one memory including computer program code, the at least one memory and the computer program code configured to with the at least one processor, cause the apparatus at least to: send to a terminal device configuration information relating to determining delay information relating to channel availability monitoring, receive delay information relating to the channel availability monitoring from the terminal device, and perform scheduling based on the delay information.

According to an eleventh aspect of the disclosure, there is provided a non-transitory computer readable medium comprising program instructions for causing an apparatus to perform at least the following: sending to a terminal device configuration information relating to determining delay information relating to channel availability monitoring, receiving delay information relating to the channel availability monitoring from the terminal device, and performing scheduling based on the delay information.

According to a twelfth aspect of the disclosure, there is provided a computer readable medium comprising program instructions for causing an apparatus to perform at least the following: sending to a terminal device configuration information relating to determining delay information relating to channel availability monitoring, receiving delay information relating to the channel availability monitoring from the terminal device, and performing scheduling based on the delay information.

BRIEF DESCRIPTION OF THE DRAWINGS

For a more complete understanding of example embodiments of the present disclosure, reference is now made to the following descriptions taken in connection with the accompanying drawings in which.

DETAILED DESCRIPTION OF THE DRAWINGS

The following embodiments are exemplifying. Although the specification may refer to "an", "one", or "some" embodiment(s) in several locations of the text, this does not necessarily mean that each reference is made to the same embodiment(s), or that a particular feature only applies to a single embodiment. Single features of different embodiments may also be combined to provide other embodiments.

Example embodiments relate to dynamic uplink scheduling in an unlicensed spectrum.

According to an example embodiment, an apparatus is configured to perform channel availability monitoring on an operating channel for transmitting uplink control information for transmitting a data packet, determine, in response to determining that the operating channel is available for transmitting the uplink control information, delay information relating to the channel availability monitoring, and transmit the uplink control information and the delay information to the radio access network.

In the following, different exemplifying embodiments will be described using, as an example of an access architecture to which the embodiments may be applied, a radio access architecture based on long term evolution advanced (LTE Advanced, LTE-A) or new radio (NR, 5G), without restricting the embodiments to such an architecture, however. It is obvious for a person skilled in the art that the embodiments may also be applied to other kinds of communications networks having suitable means by adjusting parameters and procedures appropriately. Some examples of other options for suitable systems are the universal mobile telecommunications system (UMTS) radio access network (UTRAN or E-UTRAN), long term evolution (LTE, the substantially same as E-UTRA), wireless local area network (WLAN or WiFi), worldwide interoperability for microwave access (WiMAX), Bluetooth®, personal communications services (PCS), ZigBee®, wideband code division multiple access (WCDMA), systems using ultra-wideband (UWB) technology, sensor networks, mobile ad-hoc networks (MANETs) and Internet Protocol multimedia subsystems (IMS) or any combination thereof.

Figure 1:
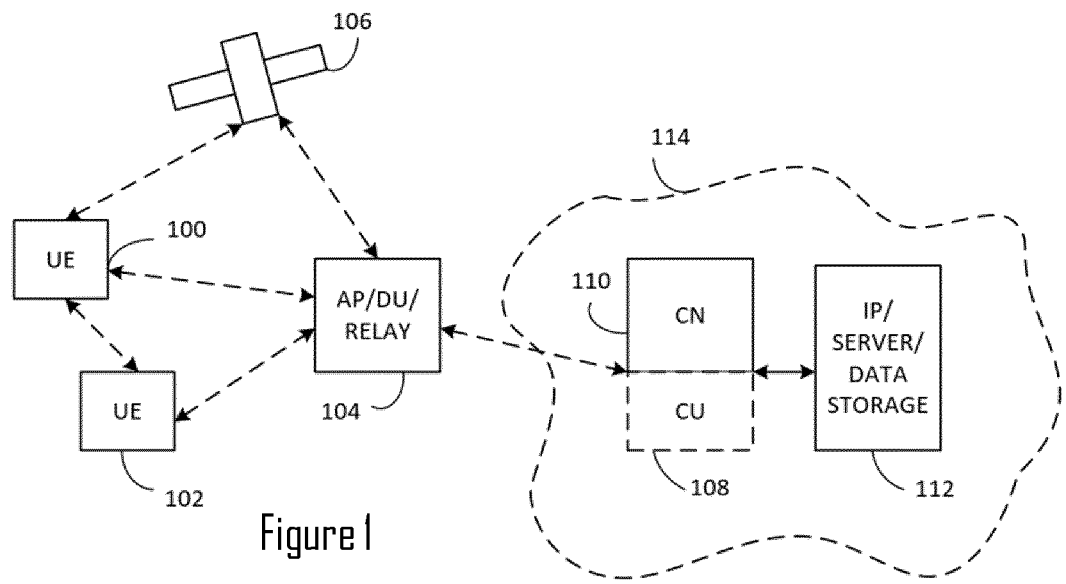
FIG. 1 shows a part of an exemplifying radio access network in which examples of disclosed embodiments may be applied.

FIG. 1 depicts examples of simplified system architectures showing some elements and functional entities, all being logical units, whose implementation may differ from what is shown. The connections shown in FIG. 1 are logical connections; the actual physical connections may be different. It is apparent to a person skilled in the art that the system typically comprises also other functions and structures than those shown in FIG. 1.

The embodiments are not, however, restricted to the system given as an example but a person skilled in the art may apply the solution to other communication systems provided with necessary properties.

The example of FIG. 1 shows a part of an exemplifying radio access network.

FIG. 1 shows user devices 100 and 102 configured to be in a wireless connection on one or more communication channels in a cell with an access node (such as (e/g)NodeB) 104 providing the cell. The physical link from a user device to a (e/g)NodeB is called uplink or reverse link and the physical link from the (e/g)NodeB to the user device is called downlink or forward link. It should be appreciated that (e/g)NodeBs or their functionalities may be implemented by using any node, host, server or access point etc. entity suitable for such a usage.

A communications system typically comprises more than one (e/g)NodeB in which case the (e/g)NodeBs may also be configured to communicate with one another over links, wired or wireless, designed for the purpose. These links may be used not only for signalling purposes but also for routing data from one (e/g)NodeB to another. The (e/g)NodeB is a computing device configured to control the radio resources of communication system it is coupled to. The NodeB may also be referred to as a base station, an access point, an access node, or any other type of interfacing device including a relay station capable of operating in a wireless environment. The (e/g)NodeB includes or is coupled to transceivers. From the transceivers of the (e/g)NodeB, a connection is provided to an antenna unit that establishes bi-directional radio links to user devices. The antenna unit may comprise a plurality of antennas or antenna elements. The (e/g)NodeB is further connected to core network 110 (CN or next generation core NGC). Depending on the system, the counterpart on the CN side can be a serving gateway (S-GW, routing and forwarding user data packets), packet data network gateway (P-GW), for providing connectivity of user devices (UEs) to external packet data networks, or mobile management entity (MME), etc.

The user device (also called UE, user equipment, user terminal, terminal device, etc.) illustrates one type of an apparatus to which resources on the air interface are allocated and assigned, and thus any feature described herein with a user device may be implemented with a corresponding apparatus, such as a relay node. An example of such a relay node is a layer 3 relay (self-backhauling relay) towards the base station.

The user device typically refers to a portable computing device that includes wireless mobile communication devices operating with or without a subscriber identification module (SIM), including, but not limited to, the following types of devices: a mobile station (mobile phone), smartphone, personal digital assistant (PDA), handset, device using a wireless modem (alarm or measurement device, etc.), laptop and/or touch screen computer, tablet, game console, notebook, and multimedia device. It should be appreciated that a user device may also be a nearly exclusive uplink only device, of which an example is a camera or video camera loading images or video clips to a network. A user device may also be a device having capability to operate in Internet of Things (IoT) network which is a scenario in which objects are provided with the ability to transfer data over a network without requiring human-to-human or human-to-computer interaction. The user device may also utilise cloud. In some applications, a user device may comprise a small portable device with radio parts (such as a watch, earphones or eyeglasses) and the computation is carried out in the cloud. The user device (or in some embodiments a layer 3 relay node) is configured to perform one or more of user equipment functionalities. The user device may also be called a subscriber unit, mobile station, remote terminal, access terminal, user terminal or user equipment (UE) just to mention but a few names or apparatuses.

A wireless device is a generic term that encompasses both the access node and the terminal device.

Various techniques described herein may also be applied to a cyber-physical system (CPS) (a system of collaborating computational elements controlling physical entities). CPS may enable the implementation and exploitation of massive amounts of interconnected ICT devices (sensors, actuators, processors microcontrollers, etc.) embedded in physical objects at different locations. Mobile cyber physical systems, in which the physical system in question has inherent mobility, are a subcategory of cyber-physical systems. Examples of mobile physical systems include mobile robotics and electronics transported by humans or animals.

Additionally, although the apparatuses have been depicted as single entities, different units, processors and/or memory units (not all shown in FIG. 1) may be implemented.

5G enables using multiple input-multiple output (MIMO) antennas, many more base stations or nodes than the LTE (a so-called small cell concept), including macro sites operating in co-operation with smaller stations and employing a variety of radio technologies depending on service needs, use cases and/or spectrum available. 5G mobile communications supports a wide range of use cases and related applications including video streaming, augmented reality, different ways of data sharing and various forms of machine type applications (such as (massive) machine-type communications (mMTC), including vehicular safety, different sensors and real-time control. 5G is expected to have multiple radio interfaces, namely below 6 GHz, cmWave and mmWave, and also being integradable with existing legacy radio access technologies, such as the LTE. Integration with the LTE may be implemented, at least in the early phase, as a system, where macro coverage is provided by the LTE and 5G radio interface access comes from small cells by aggregation to the LTE. In other words, is planned to support both inter-RAT operability (such as LTE-5G) and inter-RI operability (inter-radio interface operability, such as below 6 GHz—cmWave, below 6 GHz—cmWave—mmWave). One of the concepts considered to be used in 5G networks is network slicing in which multiple independent and dedicated virtual sub-networks (network instances) may be created within the substantially same infrastructure to run services that have different requirements on latency, reliability, throughput and mobility.

The current architecture in LTE networks is fully distributed in the radio and fully centralized in the core network. The low-latency applications and services in require to bring the content close to the radio which leads to local break out and multi-access edge computing (MEC). 5G enables analytics and knowledge generation to occur at the source of the data. This approach requires leveraging resources that may not be continuously connected to a network such as laptops, smartphones, tablets and sensors. MEC provides a distributed computing environment for application and service hosting. It also has the ability to store and process content in close proximity to cellular subscribers for faster response time. Edge computing covers a wide range of technologies such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomic self-healing networks, remote cloud services, augmented and virtual reality, data caching, Internet of Things (massive connectivity and/or latency critical), critical communications (autonomous vehicles, traffic safety, real-time analytics, time-critical control, healthcare applications).

The communication system is also able to communicate with other networks, such as a public switched telephone network or the Internet 112, or utilise services provided by them. The communication network may also be able to support the usage of cloud services, for example at least part of core network operations may be carried out as a cloud service (this is depicted in FIG. 1 by "cloud" 114). The communication system may also comprise a central control entity, or a like, providing facilities for networks of different operators to cooperate for example in spectrum sharing.

Edge cloud may be brought into radio access network (RAN) by utilizing network function virtualization (NVF) and software defined networking (SDN). Using edge cloud may mean access node operations to be carried out, at least partly, in a server, host or node operationally coupled to a remote radio head or base station comprising radio parts. It is also possible that node operations will be distributed among a plurality of servers, nodes or hosts. Application of cloudRAN architecture enables RAN real time functions being carried out at the RAN side (in a distributed unit, DU 104) and non-real time functions being carried out in a centralized manner (in a centralized unit, CU 108).

It should also be understood that the distribution of functions between core network operations and base station operations may differ from that of the LTE or even be non-existent. Some other technology advancements probably to be used are Big Data and all-IP, which may change the way networks are being constructed and managed. 5G (or new radio, NR) networks are being designed to support multiple hierarchies, where MEC servers can be placed between the core and the base station or node B (gNB). It should be appreciated that MEC can be applied in 4G networks as well.

5G may also utilize satellite communication to enhance or complement the coverage of 5G service, for example by providing backhauling. Possible use cases are providing service continuity for machine-to-machine (M2M) or Internet of Things (IoT) devices or for passengers on board of vehicles, or ensuring service availability for critical communications, and future railway, maritime, and/or aeronautical communications. Satellite communication may utilise geostationary earth orbit (GEO) satellite systems, but also low earth orbit (LEO) satellite systems, in particular mega-constellations (systems in which hundreds of (nano)satellites are deployed). At least one satellite 106 in the mega-constellation may cover several satellite-enabled network entities that create on-ground cells. The on-ground cells may be created through an on-ground relay node 104 or by a gNB located on-ground or in a satellite.

It is obvious for a person skilled in the art that the depicted system is only an example of a part of a radio access system and in practice, the system may comprise a plurality of (e/g)NodeBs, the user device may have an access to a plurality of radio cells and the system may comprise also other apparatuses, such as physical layer relay nodes or other network elements, etc. At least one of the (e/g)NodeBs or may be a Home(e/g)nodeB. Additionally, in a geographical area of a radio communication system a plurality of different kinds of radio cells as well as a plurality of radio cells may be provided. Radio cells may be macro cells (or umbrella cells) which are large cells, usually having a diameter of up to tens of kilometers, or smaller cells such as micro-, femto- or picocells. The (e/g)NodeBs of FIG. 1 may provide any kind of these cells. A cellular radio system may be implemented as a multilayer network including several kinds of cells. Typically, in multilayer networks, one access node provides one kind of a cell or cells, and thus a plurality of (e/g)NodeBs are needed to provide such a network structure.

For fulfilling the need for improving the deployment and performance of communication systems, the concept of "plug-and-play" (e/g)NodeBs has been introduced. Typically, a network which is able to use "plug-and-play" (e/g)Node Bs, includes, in addition to Home (e/g)NodeBs (H(e/g)nodeBs), a home node B gateway, or HNB-GW (not shown in FIG. 1). A HNB Gateway (HNB-GW), which is typically installed within an operator's network may aggregate traffic from a large number of HNBs back to a core network.

As commonly known in connection with wireless communication systems, control or management information is transferred over a radio interface, e.g. between the terminal device 100 and the access node 104.

5G New Radio (NR) networks are designed to support a wide range of frequency spectrum bands. The spectrum can be categorised into a licensed spectrum and an unlicensed spectrum. The licensed spectrum is assigned exclusively to operators for independent usage while the unlicensed spectrum is available for non-exclusive usage by any user. In other words, operating on an unlicensed spectrum is subject to interference of other users on a shared frequency band.

Due to interference issues on the unlicensed spectrum, channel access for an unlicensed spectrum operation typically uses different co-existence methods to enable co-existence with other devices on the same frequency band. An example of a co-existence method is, for example, a Listen-Before-Talk (LBT) protocol for sharing the unlicensed spectrum with other devices. The LBT protocol specifies that a device does not transmit on a channel that is occupied by some other device. There are different types of LBT procedures that may be applied depending on, for example, whether the device performing LBT is an initiating or responding device, whether the transmission of the device is within the Channel Occupancy Time (COT) previously acquired by an initiating device, for how long the responding device is going to transmit on the channel, what is the gap between the start of the transmission of the responding device and the end of transmission of the initiating device, or the like.

An LBT procedure may comprise performing clear channel assessment (CCA). CCA is a mechanism for determining whether an operating channel is available for transmitting data. CCA utilizes energy detection (ED) to determine presence of signals on a channel. An operating channel shall be considered occupied, if the energy level on the operating channel exceeds a predetermined threshold value.

An LBT procedure may cause significant delay in unlicensed spectrum that, in turn, causes performance degradation of ultra-reliable low-latency communication (URLLC) and time sensitive communication (TSC) services.

LBT may be challenging especially if the network uses dynamic uplink scheduling. Dynamic uplink scheduling comprises a mechanism for dynamically allocating resources for transmitting data. Dynamic uplink scheduling comprises dynamically controlling by a radio access network (RAN) which terminal devices are to transmit on which uplink resources, at which time and with which transmission parameters. Even though dynamic uplink scheduling allows taking into account variations in traffic and radio channel quality thereby enabling efficient use of available resources, dynamic scheduling may cause challenges in an unlicensed spectrum.

With dynamic uplink scheduling in an unlicensed spectrum, a terminal device needs to inform a RAN that the terminal device comprises data to be transmitted and request uplink resources using a scheduling request (SR). However, before communicating with the RAN the terminal device needs to perform channel availability monitoring for determining whether an operating channel is available for transmitting the SR. Further, when the terminal device receives a scheduling grant (SG) to transmit the data, the terminal device needs to again perform channel availability monitoring before transmitting the data.

However, if the terminal device with a pending SR determines that the unlicensed spectrum is busy and therefore cannot transmit the SR, the terminal device will miss the closest transmission occasion provided by a RAN and need to wait for a subsequent transmission occasion for performing the SR transmission. This, in turn, leads to an increase in the packet latency as the network cannot provide an SG to transmit the actual payload in a timely manner.

Further, for sporadic URLLC transmissions, a RAN may not have information on a need to transmit the data packet or information relating to a duration of the LBT procedure performed by the terminal device. Therefore, the RAN may not be able differentiate and/or prioritize data packets that are closer to infringing their latency requirements.

Figure 2:
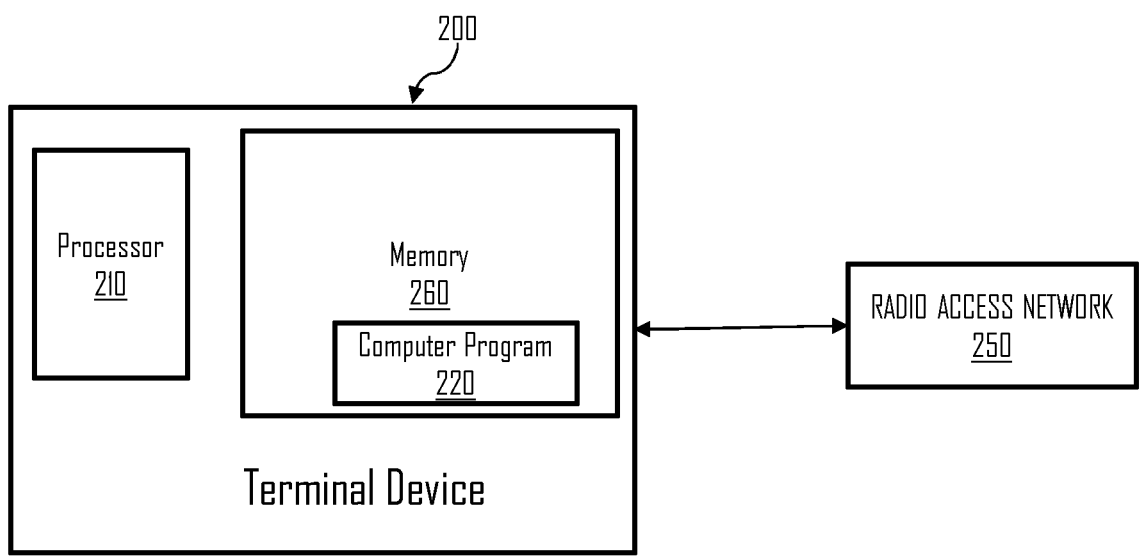
FIG. 2 shows a block diagram of an example apparatus in which examples of the disclosed embodiments may be applied.

The example of FIG. 2 shows an exemplifying apparatus.

FIG. 2 is a block diagram depicting the apparatus 200 operating in accordance with an example embodiment of the disclosure. The apparatus 200 may be, for example, an electronic device such as a chip, chip-set, or a terminal device such as user equipment (UE). In the example of FIG. 2, the apparatus 200 is a terminal device configured to communicate with a radio access network (RAN) 250 such as a gNodeB. The apparatus 200 includes a processor 210 and a memory 260. In other examples, the apparatus 200 may comprise multiple processors.

In the example of FIG. 2, the processor 210 is a control unit operatively connected to read from and write to the memory 260. The processor 210 may also be configured to receive control signals received via an input interface and/or the processor 210 may be configured to output control signals via an output interface. In an example embodiment the processor 210 may be configured to convert the received control signals into appropriate commands for controlling functionalities of the apparatus.

The memory 260 stores computer program instructions 220 which when loaded into the processor 210 control the operation of the apparatus 200 as explained below. In other examples, the apparatus 200 may comprise more than one memory 260 or different kinds of storage devices.

Computer program instructions 220 for enabling implementations of example embodiments of the disclosure or a part of such computer program instructions may be loaded onto the apparatus 200 by the manufacturer of the apparatus 200, by a user of the apparatus 200, or by the apparatus 200 itself based on a download program, or the instructions can be pushed to the apparatus 200 by an external device. The computer program instructions may arrive at the apparatus 200 via an electromagnetic carrier signal or be copied from a physical entity such as a computer program product, a memory device or a record medium such as a Compact Disc (CD), a Compact Disc Read-Only Memory (CD-ROM), a Digital Versatile Disk (DVD) or a Blu-ray disk.

According to an example embodiment, the apparatus 200 comprises a terminal device. A terminal device may comprise user equipment (UE) such as a smartphone or a tablet computer.

According to an example embodiment, the apparatus 200 is configured to communicate with an access node such as a radio access network (RAN) 250.

Communicating with an access node may comprise, for example, transmitting uplink control information such as one or more scheduling requests (SR) to the RAN, receiving a scheduling grant (SG) from the RAN, transmitting one or more data packets to the RAN and/or receiving one or more data packet from the RAN.

According to an example embodiment, a scheduling request comprises a request for allocating uplink resources for transmitting one or more data packets.

The apparatus 200 may be configured to transmit an SR using a physical uplink control channel (PUCCH) that carries uplink control information (UCI). UCI may comprise channel state information (CSI), an SR and/or information relating to error detection and correction such as hybrid automated repeat request (HARQ) feedback. A PUCCH channel may utilize a plurality of different decoding formats and a particular PUCCH format is selected based on the amount of information that should be carried and the duration of the PUCCH transmission.

The apparatus 200 may further be configured to transmit, in response receiving an SG, data using resources allocated for the apparatus 200. For example, the apparatus 200 may be configured to transmit the data using a physical uplink shared channel (PUSCH).

As mentioned above, an unlicensed spectrum is available for non-exclusive usage by any user. An unlicensed spectrum may comprise different frequency bands, for example, 2.4 GHz (2400-2483.5 MHz), 5 GHz (5150-5350 MHz) or 60 GHz (57-71 GHz) frequency band. Unlicensed spectrum may comprise different frequency bands in different geographical areas such as Europe and the USA.

According to an example embodiment, the apparatus 200 is configured to receive an indication of a data packet to be transmitted to the RAN 250. The indication may comprise, for example, an external indication or an internal indication such as an indication from a medium access control (MAC) layer.

According to an example embodiment, the data packet comprises an uplink (UL) data packet. The data packet may comprise, for example, a data packet relating to ultra-reliable low-latency communication (URLLC) services or industrial internet of things (IIoT).

According to an example embodiment, the apparatus 200 is configured to initiate, in response to receiving the indication of the data packet to be transmitted to the RAN 250, channel availability monitoring on an operating channel. According to an example embodiment, the apparatus 200 is configured to perform channel availability monitoring prior to transmitting the data packet to the RAN 250.

Channel availability monitoring may comprise monitoring an operating channel to determine whether the operating channel is available for transmitting data on the operating channel. Alternatively or additionally, channel availability monitoring may comprise determining whether radio energy level on an operating channel is above a threshold value. The apparatus 200 may be configured to determine based on the radio energy level whether an operating channel is available or not. For example, when the radio energy level is above a threshold value, the apparatus 200 may determine that the operating channel is unavailable and when the radio energy level is below a threshold value, the apparatus 200 may determine that the operating channel is available. Channel availability monitoring may be performed continuously or discontinuously, for example, at set time intervals.

According to an example embodiment, the apparatus 200 is configured to perform channel availability monitoring on an operating channel for transmitting a uplink control information for transmitting a data packet.

According to an example embodiment, the uplink control information comprises a scheduling request for transmitting the data packet. According to another example embodiment, the uplink control information comprises configured grant uplink control information According to an example embodiment, a scheduling request (SR) comprises a message for requesting network to allocate network resources for transmission of at least one data packet to the RAN 250. For example, a scheduling request may comprise a request to allocate resources on an uplink physical channel or an enquiry whether resources on an uplink physical channel are available for transmitting the at least one data packet.

An uplink physical channel may comprise a physical data channel such as a physical uplink shared channel (PUSCH) or a physical uplink control channel such as a physical uplink control channel (PUCCH).

According to an example embodiment, the channel availability monitoring comprises clear channel assessment. As mentioned above, CCA is a mechanism for determining whether an operating channel is available for transmitting data. CCA utilizes energy detection (ED) to determine presence of signals on a channel. An operating channel shall be considered occupied, if the energy level on the operating channel exceeds a predetermined threshold value. However, there are different ways to implement clear channel assessment and therefore, clear channel assessment procedures may differ from geographical region to geographical region and/or from technology to technology.

According to an example embodiment, the operating channel is provided on an unlicensed spectrum.

Performing channel availability monitoring may comprise determining one or more parameter values indicating an effect of the channel availability monitoring on a time budget allocated for a data packet. For example, the apparatus 200 may be configured to determine, based on the one or more parameter values, a time budget consumed by the channel availability monitoring or a remaining time budget for transmitting the data packet after performing the channel availability monitoring. A time budget may comprise a predefined period of time allocated for transmitting a data packet.

According to an example embodiment, the apparatus 200 is configured to in response to determining that the operating channel is available for transmitting the uplink control information, determine delay information relating to the channel availability monitoring. For example, delay information may comprise information relating to a delay in transmitting the SR caused by unavailability of the operating channel for transmission of the scheduling request. As another example, delay information may comprise information relating to an amount of available time for transmitting the data packet after the channel availability monitoring.

According to an example embodiment, the delay information relating to the channel availability monitoring comprises a delay in transmitting the scheduling request. The delay in transmitting the scheduling request may comprise a period of time between initiating the channel availability monitoring and successful transmission of the SR.

According to an example embodiment, the delay information comprises a number of missed scheduling request occasions caused by the operating channel being unavailable for transmission of the scheduling request during channel availability monitoring. The number of missed scheduling request occasions may comprise a number of missed scheduling occasions prior to a successful SR transmission. A scheduling request occasion comprises a time interval for transmitting or initiating transmitting an SR.

According to an example embodiment, the delay information comprises a number of transmission attempts of the scheduling request caused by the operating channel being unavailable for transmission of the scheduling request during channel availability monitoring. The number of transmission attempts of the SR may comprise a number of missed transmission attempts of the SR prior to a successful SR transmission.

According to an example embodiment, the delay information comprises a duration of channel availability monitoring.

According to an example embodiment, the delay information comprises a remaining time budget for scheduling the data packet. The data packet may comprise, for example, data relating to ultra-reliable low-latency communication (URLLC). The remaining time budget for scheduling the data packet comprises a remaining time budget at the time of SR transmission.

According to an example embodiment, the delay information comprises a number of missed configured uplink occasions. For example, the delay information may comprise a number of missed configured grant PUSCH (CG-PUSCH) occasions. The delay information may be concatenated and encoded together with configured grant uplink control information (CG-UCI), encoded separately and multiplexed in the UCI on PUSCH, or included in the MAC header as a MAC control element (MAC CE).

The apparatus 200 may be configured to determine the delay information relating to the channel availability monitoring based on configuration information received from the RAN 250.

According to an example embodiment, the apparatus 200 is configured to determine the delay information based on configuration information received from the RAN 250. According to an example embodiment, the apparatus 200 is configured to receive from the radio access network configuration information relating to determining the delay information.

The configuration information relating to determining the delay information may comprise, for example, configuration information relating to the SR and configuration information relating to a physical uplink control channel (PUCCH). The configuration information relating to the SR and PUCCH may comprise resources and/or configurations for transmission of the delay information, SR and/or other uplink control information (UCI).

According to an example embodiment, the apparatus 200 is configured to transmit the uplink control information and the delay information to the radio access network. For example, the delay information and the SR may be transmitted to the RAN 250 using configured PUCCH resources or the delay information may be included in UCI and transmitted using PUSCH.

The RAN 250 may be configured to make the scheduling and/or transmission decisions based also on the delay information, in addition to the other network parameters and UE reporting. For example, the RAN 250 may be configured to use the delay information together with the status of downlink buffered data to determine whether it would be beneficial to select the lowest possible channel access priority class of the corresponding operating channel or whether it is more advantageous to select a higher channel access priority class and occupy the channel for longer period of time.

A channel access priority class may define a type of channel availability monitoring performed on an operating channel. For example, if there is one pending uplink transmission that is close to a latency deadline, the RAN 250 may be configured to perform channel availability monitoring for a shorter time than in a case where a transmission is not close to a latency deadline.

According to an example embodiment, the apparatus 200 is configured to signal the delay information by transmitting the scheduling request using specific resources.

Including the delay information into the scheduling request may comprise selecting or modifying an SR configuration based on the delay information. For example, the apparatus 200 may be configured to transmit an SR with different SR identification information such as SRs with different SchedulingRequestResourceIds of 3GPP specifications. As another example, the apparatus 200 may be configured to transmit the SR as a multi-bit SR comprising a mapping between an SR status and the delay information.

According to an example embodiment, the apparatus 200 is configured to provide a mapping between information relating to the scheduling request and the delay information. For example, delay information may be embedded in the SR in terms of reserving some of the states of the SR to signal delay information. As a further example, the apparatus 200 may be configured to append the delay information to an SR in a separate data field.

Transmitting the scheduling request and the delay information may comprise modifying the format of the delay information such that including the delay information into the scheduling request such that the delay information could be conveyed using few information bits.

According to an example embodiment, the apparatus 200 is configured to quantize the delay information.

According to an example embodiment, the RAN 250 comprises a processor and a memory. The processor is a control unit operatively connected to read from and write to the memory. The processor may also be configured to receive control signals received via an input interface and/or the processor may be configured to output control signals via an output interface. In an example embodiment the processor may be configured to convert the received control signals into appropriate commands for controlling functionalities of the RAN 250.

The memory stores computer program instructions which when loaded into the processor control the operation of the RAN 250 as explained below. In other examples, the RAN 250 may comprise more than one memory or different kinds of storage devices.

According to an example embodiment, the RAN 250 is configured to send to the apparatus 200 configuration information relating to determining delay information relating to channel availability monitoring The apparatus 200 may comprise, for example, a terminal device.

According to an example embodiment, the RAN 250 is configured to receive delay information relating to the channel availability monitoring from the apparatus 200. The delay information relating to the channel availability monitoring may be determined by the apparatus 200 based on the configuration information relating to determining the delay information.

According to an example embodiment, the RAN 250 is configured to perform scheduling based on the delay information. According to an example embodiment, scheduling comprises determining, based on the delay information, a slot configuration, modulation-and-coding scheme, multi-carrier transmission and/or data duplication. For example, the RAN 250 may be configured to determine, based on the delay information, a slot configuration, modulation-and-coding scheme (MCS), multi-carrier transmission, data duplication, or the like.

Data is transmitted using radio frames having a particular frame structure. A frame structure may comprise a structure that is designed for Frequency Division Duplex (FDD) or a frame structure that is designed for Time Division Duplex (TDD). In FDD a first operating channel is provided for downlink transmission and a second operating channel is provided for uplink transmission. In other words, different spectrum frequencies may be used at the substantially same time. In TDD both uplink transmission and downlink transmission use the substantially same frequency spectrum, but at different times. Typically, a radio frame is of 10 ms duration and a frame is further divided into slots. According to an example embodiment, a slot comprises 14 OFDM symbols.

Determining a slot configuration may comprise, for example, determining a slot configuration that conforms with service requirements of different terminal devices. For example, the RAN 250 may be configured to prioritize uplink transmissions by selecting a slot configuration with uplink symbols at the beginning or prioritizing downlink transmissions by selecting a slot with downlink symbols at the beginning.

Determining an MCS may comprise configuring an uplink transmission with a more conservative MCS and a larger amount of resources for an uplink payload that is close to a latency deadline than for an uplink payload than is not close to the latency deadline.

Determining a multi-carrier transmission may comprise providing scheduling grants through a plurality of unlicensed carriers for terminal devices in order to gain enhanced reliability and reduced CCA failure probability upon PUSCH transmission.

According to an example embodiment, the RAN 250 is configured to perform channel availability monitoring and, in response to determining that the operating channel is available for transmission, send downlink control information (DCI) using a physical downlink control channel (PDCCH) to the apparatus 200 for scheduling data transmission using a PUSCH.

According to an example embodiment, the apparatus 200 is configured to receive DCI from the RAN 250, the DCI comprising a type of channel availability monitoring to be performed by the apparatus 200. The apparatus 200 is further configured to transmit the data packet in response to determining that the operating channel is available for transmission.

According to an example embodiment, the apparatus 200 comprises means for performing the features of the apparatus 200, wherein the means for performing comprises at least one processor 210, at least one memory 260 including computer program code 220, the at least one memory 260 and the computer program code 220 configured to, with the at least one processor 210, cause the performance of the apparatus 200.

According to an example embodiment, the apparatus 200 comprises means for performing channel availability monitoring on an operating channel for transmitting a uplink control information for transmitting a data packet, means for determining, in response to determining that the operating channel is available for transmitting the uplink control information, delay information relating to the channel availability monitoring, and means for transmitting the uplink control information and the delay information to the radio access network 250.

The apparatus 200 may further comprise means for quantizing the delay information, means for including the delay information into the scheduling request, and/or means for receiving from the radio access network 250 configuration information relating to determining the delay information.

According to an example embodiment, the RAN 250 comprises means for performing the features of the RAN 250, wherein the means for performing comprises at least one processor, at least one memory including computer program code, the at least one memory and the computer program code configured to, with the at least one processor, cause the performance of the RAN 250.

According to an example embodiment, the RAN 250 comprises means for sending to a terminal device configuration information relating to determining delay information relating to channel availability monitoring, means for receiving delay information from the terminal device, and means for performing scheduling based on the delay information.

Figure 3:
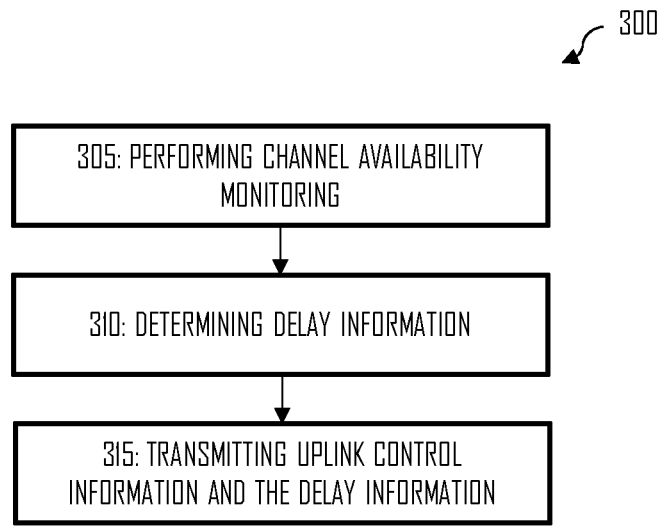
FIG. 3 illustrates an example method incorporating aspects of the examples of the disclosure.

FIG. 3 illustrates an example method 300 incorporating aspects of the previously disclosed embodiments. More specifically, the example method 300 illustrates determining delay information relating to channel availability monitoring. The method may be performed by the apparatus 200.

The method starts with performing 305 channel availability monitoring on an operating channel for transmitting a uplink control information for transmitting a data packet.

The uplink control information may comprise, for example, a scheduling request for transmitting the data packet or configured grant uplink control information.

Channel availability monitoring may comprise monitoring an operating channel to determine whether the operating channel is available for transmitting data on the operating channel.

In the example of FIG. 3, the uplink control information comprise a request to allocate resources on an uplink physical channel or an enquiry whether resources on an uplink physical channel are available for transmitting the at least one data packet.

The method further continues with determining 310, in response to determining that the operating channel is available for transmitting the uplink control information, delay information relating to the channel availability monitoring. In the example of FIG. 3, the delay information relating to the channel availability monitoring may comprise a delay in transmitting the scheduling request such as a number of missed scheduling request occasions caused by unavailability of the operating channel for transmission of the scheduling request during the channel availability monitoring, a number of transmission attempts of the scheduling request caused unavailability of the operating channel for transmission of the scheduling request during by the channel availability monitoring, a duration of channel availability monitoring or a remaining time budget for scheduling the data packet such as data relating to ultra-reliable low-latency communication (URLLC).

The method further continues with transmitting 315 the uplink control information and the delay information to the radio access network.

Figure 4:
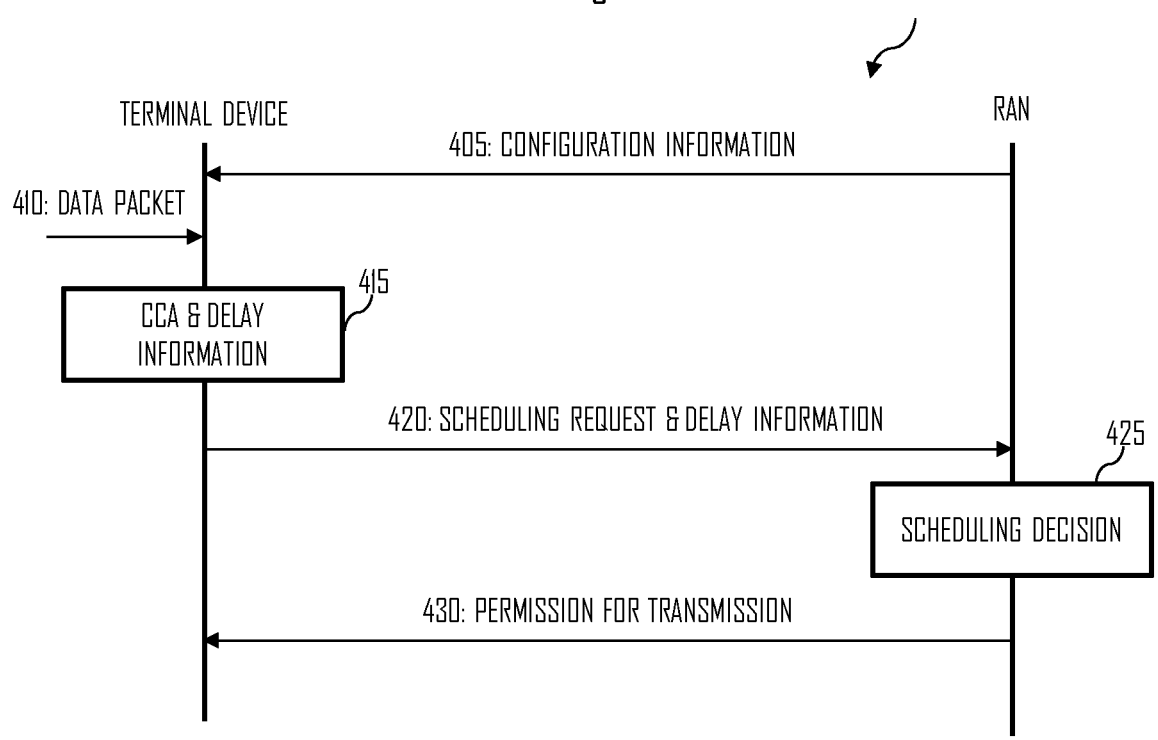
FIG. 4 illustrates an example signalling diagram incorporating aspects of the examples of the disclosure.

FIG. 4 illustrates an example signaling diagram incorporating aspects of the previously disclosed embodiments. In the example of FIG. 4, it is assumed that the terminal device comprises the apparatus 200 that is configured to communicate with a RAN such as RAN 250.

In the example of FIG. 4, the RAN sends configuration information 405 to the terminal device. The configuration information may comprise, for example, configuration information relating to determining delay information relating to channel availability monitoring performed by the terminal device.

In the example of FIG. 4, the terminal device receives an indication 410 of a data packet to be transmitted to the RAN. In the example of FIG. 4, the indication comprises an internal indication such as an indication received from a medium access control (MAC) layer. The terminal device is configured to, in response to receiving the indication of the data packet to be transmitted, perform 415 channel availability monitoring on an operating channel for transmitting a uplink control information for transmitting the data packet.

The uplink control information may comprise, for example, a scheduling request for transmitting the data packet or configured grant uplink control information. In the example of FIG. 4, it is assumed that the uplink control information comprises a scheduling request for transmitting the data packet.

In the example of FIG. 4, channel availability monitoring comprises clear channel assessment. The terminal device is further configured to determine delay information relating to the channel availability monitoring. Determining the delay information comprises determining one or more parameter values indicating an effect of the channel availability monitoring on a time budget allocated for a data packet. For example, the delay information may comprise a delay in transmitting the scheduling request such as a number of missed scheduling request occasions caused by the channel availability monitoring, a number of transmission attempts of the scheduling request caused by the channel availability monitoring, a duration of channel availability monitoring or a remaining time budget for scheduling the data packet such as data relating to ultra-reliable low-latency communication (URLLC).

The terminal device transmits, in response to determining that the operating channel is available for transmitting the scheduling request, the scheduling request and the delay information 420 to the RAN. The terminal device may be configured to quantize the delay information or map the delay information to a predetermined range.

The RAN is configured to take a scheduling decision 425 based on the delay information and send a permission 430 for transmission to the terminal device. For example, the RAN may be configured to determine, based on the delay information, a slot configuration, modulation-and-coding scheme (MCS), multi-carrier transmission, data duplication, or the like.

Figures 5, 6, 7:
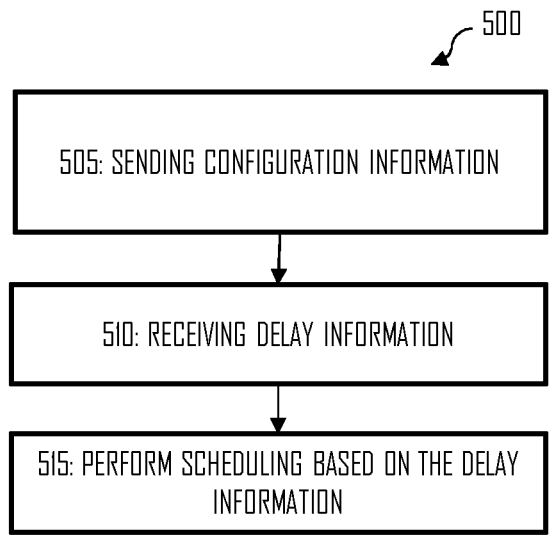
FIG. 5 illustrates another example method incorporating aspects of the examples of the disclosure.
FIG. 6 illustrates an example of including delay information in uplink control information.
FIG. 7 illustrates another example of including delay information in uplink control information.

FIG. 5 illustrates another example method 500 incorporating aspects of the previously disclose embodiments. More specifically, the example method 500 illustrates performing radio resource management by a RAN 250 based on delay information received from the apparatus 200 such as a terminal device. The method may be performed by the RAN 250.

The method starts with sending 505 configuration information to the apparatus 200. The configuration information may comprise, for example, configuration information relating to uplink scheduling such as configuration information relating to a physical uplink control channel (PUCCH) for transmitting at least one data packet to the RAN 250. In the example of FIG. 5, the configuration information comprises information relating to determining delay information relating to channel availability monitoring.

The method continues with receiving 510 delay information relating to the channel availability monitoring from the apparatus 200.

The method further continues with performing 515 scheduling based on the delay information. Scheduling may comprise, for example, determining, based on the delay information, a slot configuration, time resources and modulation-and-coding scheme to be used for transmitting the at least one data packet, configuration of multi-carrier transmission or data duplication. For example, the RAN may be configured to determine, based on the delay information, a slot configuration, modulation-and-coding scheme (MCS), multi-carrier transmission, data duplication, or the like.

FIG. 6 illustrates an example of including the delay information in an SR. More specifically, the example of FIG. 6 illustrates including a number of missed SR occasions in the SR.

As mentioned above, the apparatus 200 may be configured to determine the delay information relating to the channel availability monitoring based on configuration information received from the RAN 250.

The configuration information may comprise, for example, different PUCCH formats such as format 0 or format 1 for sending an SR. The configuration information may further comprise an instruction to associate a particular number of missed SR occasions with a particular SchedulingRequestResourceId of 3GPP specifications. A SchedulingRequestResourceId determines PUCCH resources for an SR.

In the example of FIG. 6, the number of missed SRs are mapped with available PUCCH resources. In the example of FIG. 6, zero missed SRs are mapped with SchedulingRequestResourceId 0, one missed SR is mapped with SchedulingRequestResourceId 1, two missed SRs are mapped with SchedulingRequestResourceId 2 and more than two missed SRs are mapped with SchedulingRequestResourceId 3.

FIG. 7 illustrates another example of including the delay information in an SR. More specifically, the example of FIG. 7 illustrates mapping the delay information and an SR status to corresponding bit sequences.

As mentioned above, the apparatus 200 may be configured to determine the delay information relating to the channel availability monitoring based on configuration information received from the RAN 250.

The configuration information may comprise, for example, different PUCCH formats such as formats 2, 3 or 4 for sending an SR. The configuration information may further comprise an instruction to send the SR and delay information as a multi-bit SR using a set of resources with PUCCH formats 2, 3 or 4. The apparatus 200 may be configured to receive the configuration information, for example, as a mapping table representing a joint mapping of an SR status and the delay information to corresponding bit sequences.

In the example of FIG. 7, the delay information and an SR status are mapped to corresponding bit sequences. In the example of FIG. 7, SR bits 00 correspond to a situation in which there is no SR nor delay information. SR bits 01 correspond to a situation where the SR status is positive and the delay information is zero. SR bits 10 correspond to a situation where the SR status is positive and the delay information is one. SR bits 11 correspond to a situation where the SR status is positive and the delay information equal or greater than two.

Figure 8:
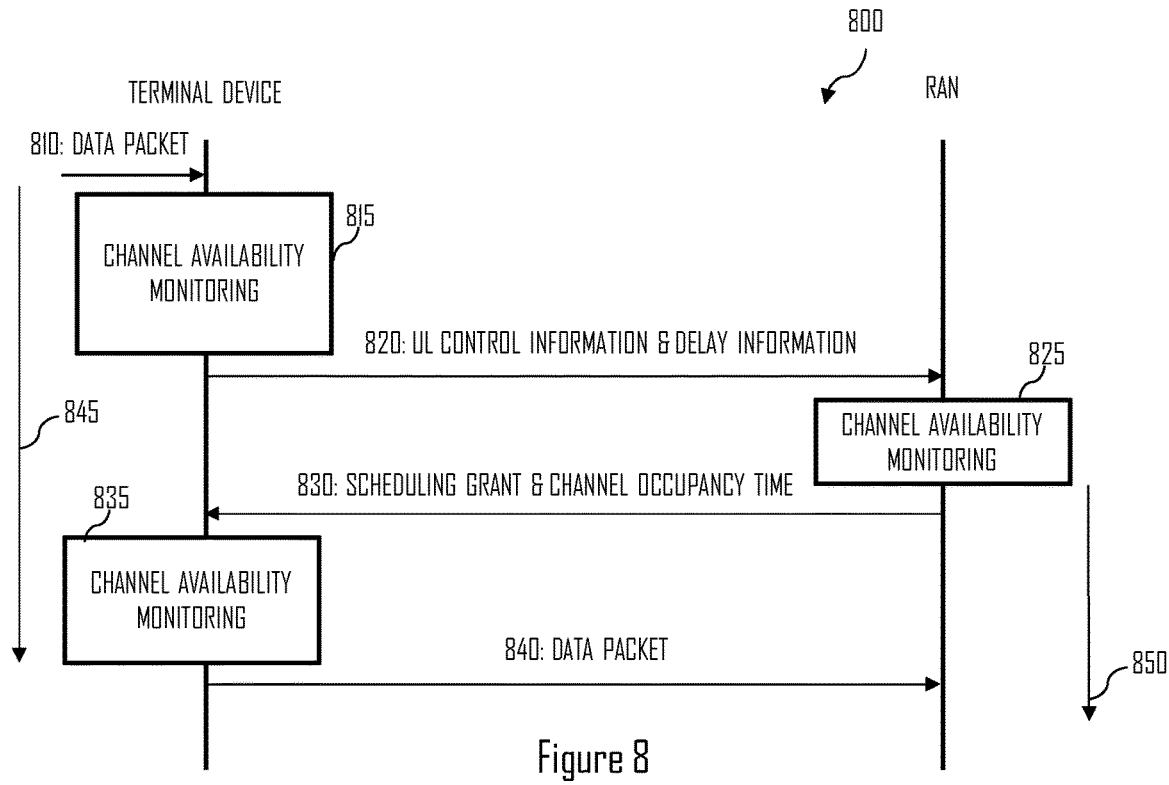
FIG. 8 illustrates an example signalling diagram incorporating aspects of the examples of the disclosure.

FIG. 8 illustrates an example signaling diagram 800 incorporating aspects of the previously disclosed embodiments. More specifically, FIG. 8 illustrates an example of using delay information together with a status of downlink buffered data to determine whether it would be beneficial to select the lowest possible channel access priority class of the corresponding operating channel or whether it is more advantageous to select a higher channel access priority class and occupy the channel for longer period of time. In the example of FIG. 8, it is assumed that the terminal device comprises the apparatus 200 that is configured to communicate with a RAN such as RAN 250.

In the example of FIG. 8, the terminal device receives an indication 810 of a data packet to be transmitted to the RAN. A time budget for transmitting the data packet in indicated in FIG. 8 by arrow 845. The indication of the data packet may comprise, for example, an internal indication such as an indication received from a medium access control (MAC) layer.

The terminal device is configured to, in response to receiving the indication of the data packet to be transmitted, perform 815 channel availability monitoring on an operating channel for transmitting uplink control information for transmitting the data packet. The uplink control information may comprise, for example, a scheduling request for transmitting the data packet or configured grant (CG) control information. In the example of FIG. 8, it is assumed that the uplink control information comprises a scheduling request.

In the example of FIG. 8, the channel availability monitoring 815 takes a large part of the time budget allocated for the data packet. The terminal device transmits, in response to determining that the operating channel is available for transmitting the scheduling request, the scheduling request and the delay information 820 to the RAN. In the example of FIG. 8, the delay information comprises a duration of the channel availability monitoring performed by the terminal device.

The RAN decides, based on the delay information, to perform 825 channel availability monitoring for a shorter period of time with the highest channel access priority in order to provide in time the terminal device with a scheduling grant for uplink transmission. However, a higher priority enables a shorter maximum channel occupation time (MCOT) 850.

The RAN is configured to perform 825 channel availability monitoring before sending 830 a scheduling grant and information on available channel occupancy time (COT) to the terminal device. The terminal device then performs 835 channel availability monitoring and, in response to determining that the operating channel is available for transmitting the scheduling request, transmits 840 the data packet.

Figure 9:
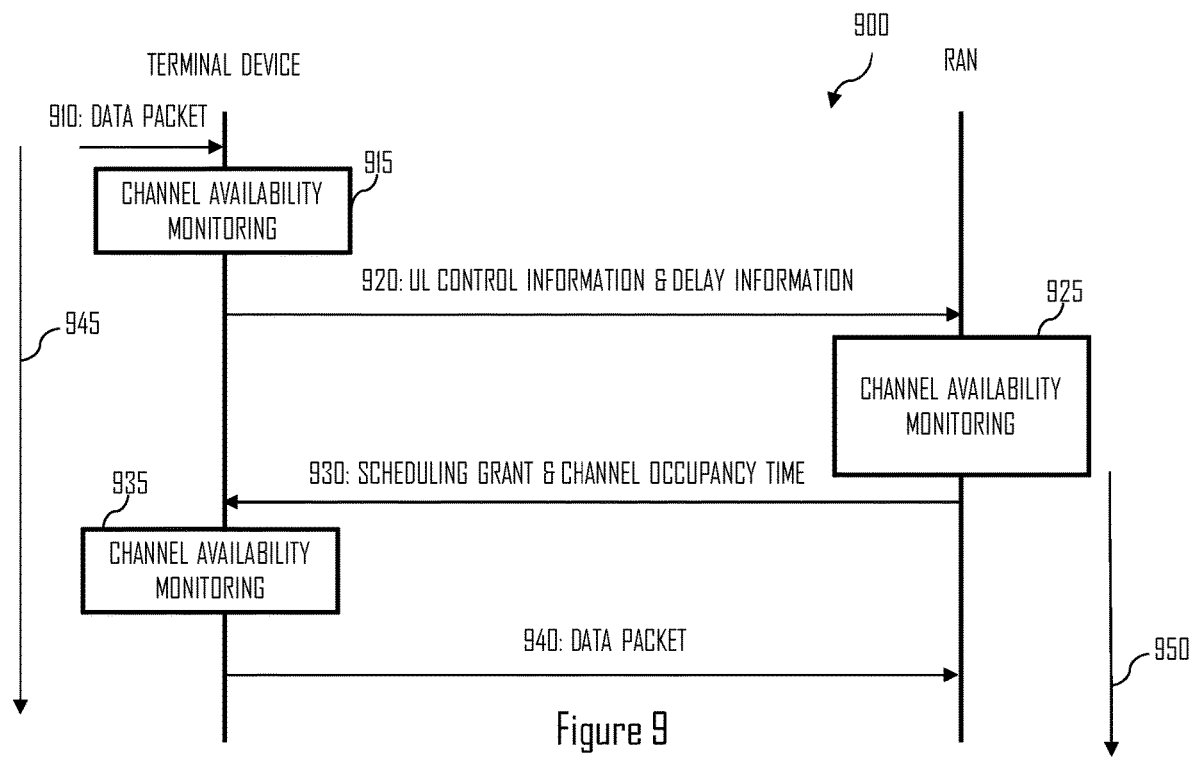
FIG. 9 illustrates another example signalling diagram incorporating aspects of the examples of the disclosure.

FIG. 9 illustrates an example signaling diagram 900 incorporating aspects of the previously disclosed embodiments. More specifically, FIG. 9 illustrates another example of using delay information together with a status of downlink buffered data to determine whether it would be beneficial to select the lowest possible channel access priority class of the corresponding operating channel or whether it is more advantageous to select a higher channel access priority class and occupy the channel for longer period of time. In the example of FIG. 9, it is assumed that the terminal device comprises the apparatus 200 that is configured to communicate with a RAN such as RAN 250.

In the example of FIG. 9, the terminal device receives an indication 910 of a data packet to be transmitted to the RAN. A time budget for transmitting the data packet in indicated in FIG. 9 by arrow 945. The indication of the data packet may comprise, for example, an internal indication such as an indication received from a medium access control (MAC) layer.

Similarly to FIG. 8, the terminal device is configured to, in response to receiving the indication of the data packet to be transmitted, perform 915 channel availability monitoring on an operating channel for transmitting uplink control information for transmitting the data packet. The uplink control information may comprise, for example, a scheduling request for transmitting the data packet or configured grant (CG) control information. In the example of FIG. 9, it is assumed that the uplink control information comprises a scheduling request.

In the example of FIG. 9, the channel availability monitoring 915 takes a relatively small part of the time budget allocated for the data packet. The terminal device transmits, in response to determining that the operating channel is available for transmitting the scheduling request, the scheduling request and the delay information 920 to the RAN. In the example of FIG. 9, the delay information comprises a duration of the channel availability monitoring performed by the terminal device.

The RAN decides, based on the delay information, to perform 925 channel availability monitoring for a longer period of time with a lower channel access priority as the data transmission is not close to a transmission deadline yet. A lower priority enables a longer maximum channel occupation time (MCOT) 950.

The RAN is configured to perform 925 channel availability monitoring before sending 930 a scheduling grant and information on available channel occupancy time (COT) to the terminal device. The terminal device then performs 935 channel availability monitoring and, in response to determining that the operating channel is available for transmitting the scheduling request, transmits 940 the data packet.

Without limiting the scope of the claims, an advantage of transmitting uplink control information and delay information to a RAN is that the RAN may be informed of a remaining time budget for a data packet.

Without in any way limiting the scope, interpretation, or application of the claims appearing below, a technical effect of one or more of the example embodiments disclosed herein is that a RAN may use the delay information for prioritizing data packets to improve performance of URLLC/TSC services.

As used in this application, the term "circuitry" may refer to one or more or all of the following: (a) hardware-only circuit implementations (such as implementations in only analog and/or digital circuitry) and (b) combinations of hardware circuits and software, such as (as applicable): (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation.

Embodiments of the present disclosure may be implemented in software, hardware, application logic or a combination of software, hardware and application logic. The software, application logic and/or hardware may reside on the apparatus, a separate device or a plurality of devices. If desired, part of the software, application logic and/or hardware may reside on the apparatus, part of the software, application logic and/or hardware may reside on a separate device, and part of the software, application logic and/or hardware may reside on a plurality of devices. In an example embodiment, the application logic, software or an instruction set is maintained on any one of various conventional computer-readable media. In the context of this document, a 'computer-readable medium' may be any media or means that can contain, store, communicate, propagate or transport the instructions for use by or in connection with an instruction execution system, apparatus, or device, such as a computer, with one example of a computer described and depicted in FIG. 2. A computer-readable medium may comprise a computer-readable storage medium that may be any media or means that can contain or store the instructions for use by or in connection with an instruction execution system, apparatus, or device, such as a computer.

If desired, the different functions discussed herein may be performed in a different order and/or concurrently with each other. Furthermore, if desired, one or more of the above-described functions may be optional or may be combined.

Although various aspects of the disclosure are set out in the independent claims, other aspects of the disclosure comprise other combinations of features from the described embodiments and/or the dependent claims with the features of the independent claims, and not solely the combinations explicitly set out in the claims.

It will be obvious to a person skilled in the art that, as the technology advances, the inventive concept can be implemented in various ways. The disclosure and its embodiments are not limited to the examples described above but may vary within the scope of the claims.

The invention claimed is:

1. A terminal device comprising at least one processor and at least one memory including computer program code, the at least one memory and the computer program code configured to with the at least one processor, cause the terminal device at least to:
   perform channel availability monitoring on an operating channel for transmitting uplink control information for transmitting a data packet,
      wherein the channel availability monitoring comprises clear channel assessment,
      wherein performing channel availability monitoring comprises determining, based on a parameter value, a time budget for transmitting the data packet after performing the channel availability monitoring, wherein the time budget is a predefined period of time, and wherein the time budget comprises a remaining time budget at the time of scheduling request transmission determined based on a number of missed scheduling request occasions or a duration of the channel availability monitoring,
      wherein the operating channel is provided on an unlicensed spectrum,
      wherein the uplink control information comprises a scheduling request for transmitting the data packet or configured grant uplink control information, and
      wherein the data packet includes data relating to ultra-reliable low-latency communication (URLLC);
   receive from a radio access network configuration information relating to determining delay information relating to the channel availability monitoring,
      wherein the configuration information includes configuration information relating to the scheduling request and configuration information relating to a physical uplink control channel (PUCCH);
   in response to determining that the operating channel is available for transmitting the uplink control information, determine the delay information relating to the channel availability monitoring, wherein the delay information relating to the channel availability monitoring comprises a delay in transmitting the uplink control information;
   quantize the delay information;
   provide a mapping between information relating to the uplink control information and the delay information, wherein the mapping comprises associating a particular number of missed scheduling request occasions with specific SchedulingRequestResourceIds or encoding a number of missed scheduling request occasions and scheduling request status as a multi-bit sequence, the mapping being configured to indicate a remaining time budget for transmitting the data packet based on the delay information;
   transmit the uplink control information and the delay information to the radio access network, wherein the terminal device is caused to signal the delay information by transmitting the uplink control information using specific resources.

\* \* \* \* \*